United States Patent [19]

Shiraishi et al.

[11] Patent Number: 5,143,036
[45] Date of Patent: Sep. 1, 1992

[54] MULTI-VALVE INTERNAL COMBUSTION ENGINE

[75] Inventors: Toru Shiraishi; Shunji Masuda; Noriyuki Iwata, all of Hiroshima, Japan

[73] Assignee: Mazda Motor Corporation, Hiroshima, Japan

[21] Appl. No.: 675,627

[22] Filed: Mar. 27, 1991

[30] Foreign Application Priority Data

Mar. 29, 1990 [JP] Japan .................................. 2-84558

[51] Int. Cl.⁵ .............................................. F02B 31/00
[52] U.S. Cl. ..................................... 123/308; 123/432
[58] Field of Search ................... 123/188 M, 308, 309, 123/432

[56] References Cited

U.S. PATENT DOCUMENTS 4,548,175 10/1985 Kawai et al. .......................... 123/308
4,570,590 2/1986 Kawai et al. .......................... 123/308

FOREIGN PATENT DOCUMENTS 58-113512 7/1983 Japan .
61-215422 9/1986 Japan .
61-204922 12/1986 Japan .
63-34124 2/1987 Japan .

Primary Examiner—Noah P. Kamen
Attorney, Agent, or Firm—Fleit, Jacobson, Cohn, Price, Holman & Stern

[57] ABSTRACT

A multi-valve internal combustion engine has a plurality of intake valves, and the same number of intake ports as there are intake valves, for each engine cylinder. One of the intake ports forms a helical passage, opening into a center of a combustion chamber of the engine at the location of a spark plug, which is disposed adjacent an intake valve located in the center intake port. In addition to a fuel injector disposed in one of the intake ports, a secondary fuel injector, energized so as to inject fuel when the engine operates at lower loads, is preferably disposed adjacent the intake valve located in the one intake port.

9 Claims, 4 Drawing Sheets

MULTI-VALVE INTERNAL COMBUSTION ENGINE

BACKGROUND OF THE INVENTION

1. Field of the Invention

The present invention relates to an internal combustion engine and, more particularly, to a multi-valve internal combustion engine having a plurality of intake valves and intake ports for one cylinder.

2. Description of Related Art

One known internal combustion engine has been provided with improved charging efficiency obtained by providing at least three intake ports for one cylinder of the engine which are opened and shut at predetermined timings by intake valves. Such a multiple intake, or "multi-intake," valve internal combustion engine is known from, for instance, a Japanese patent application entitled "MultiIntake Valve Engine," filed on Mar. 22, 1985, and published as Japanese Unexamined Patent Publication No. 61-215422 on Sept. 25, 1986.

This kind of multi-intake valve internal combustion engine has the advantage of providing a high degree of freedom in designing the shape and arrangement, or layout, of intake ports and intake valves and the timing at which the intake ports are opened and shut by the intake valves. Additionally, the use of a variety of specifically designed engines including multi-intake valve arrangements can improve fuel performance and engine output.

Multi-intake valve internal combustion engines, such as that described in the Japanese publication referred to above, have three intake ports, one of which is closed in an engine operating range of lower engine loads and lower engine speeds so as to cause intake air to be delivered into the combustion chamber of the engine through two other spiral intake ports. These spiral intake ports form a swirling fuel flow, which, as is well known in the art, provides improved fuel combustion in the combustion chamber. All three intake ports are opened in an engine operating range of higher engine loads and higher engine speeds to deliver a large amount of intake air into the combustion chamber and provide a high engine output.

Typically, the lower the air-fuel (A/F) ratio of a fuel mixture is, the lower the rate of fuel consumption of an engine becomes. Therefore, the air-fuel ratio of a fuel mixture should be made as low as possible, in order to improve fuel economy. However, because a fuel mixture having a low air fuel ratio does not burn readily and, when it does burn, causes the spread of flares to be somewhat sluggish, a fuel mixture having low air-fuel ratio is disadvantageous in that it produces unstable fuel combustion.

To eliminate fuel combustion instability of a fuel mixture having a low air-fuel ratio, it has been proposed to form an intake port which is tangential to, or else helical with respect to, an inner surface of a cylinder, and to terminate fuel injection a little earlier than the time at which the intake port is closed by an intake valve.

In such an internal combustion engine, when the engine operates in a range of medium loads, air only is delivered into the combustion chamber in the first half of the intake cycle. This causes a stratified distribution of the air-and-fuel mixture in the combustion chamber of the engine. A rich air-and-fuel mixture stratum is provided at the top of the combustion chamber, and a thin or lean air-and-fuel mixture stratum is provided along the sides and bottom of the combustion chamber. Because of the presence of a rich air-and-fuel mixture around the spark plug at the center top of the combustion chamber, the fuel mixture, even if it has a low air-fuel ratio, burns readily. On the other hand, a swirling fuel flow, produced by intake air delivered through the intake port tangentially to, or spiralling with respect to, the cylinder causes a fast spread of flares, so as to provide effective fuel combustion. The combustion process streams upward along the inner surface of the cylinder and forces the rich air-and-fuel mixture around the spark plug outward.

If the total air-fuel ratio of a stratified air-and-fuel mixture is constant, in order for the air-and-fuel mixture to provide effective fuel combustion, it is desirable to have a difference of air-fuel ratios between the rich and thin, or upper and lower, strata of the air-and-fuel mixture. However, comparing, for example, an air-and-fuel mixture having a typical overall volumetric airfuel ratio of 25:1, stratified into a rich air-and-fuel mixture having an air-fuel ratio of 20:1 and a thin air-and-fuel mixture having an air-fuel ratio of 30:1 with a rich air-and-fuel mixture having an air-fuel ratio of 15:1 and a thin air-and-fuel mixture having an air-fuel ratio of 35:1, more effective fuel combustion is obtained in the latter case. Although even the richer air-and-fuel mixture stratum having an air-and-fuel ratio of 20:1 can be fired by the spark plug, the flares produced are too weak to burn, sufficiently quickly, the thin air-and-fuel mixture stratum having an air-fuel ratio of 30:1. As compared with this, the rich air-and-fuel mixture stratum having an air-fuel ratio of 15:1 can burn sufficiently vigorously to rapidly burn the thin air-and-fuel mixture stratum having an air-and-fuel ratio of 35:1, which is leaner than the thin air-and-fuel mixture stratum having an air-and-fuel ratio of 30:1. Accordingly, the more an upper stratum of air-and-fuel mixture is enriched, the more effectively the air-and-fuel mixture burns. Based on this, it is clear that it is necessary for a stratified air-and-fuel mixture to have the air-fuel ratio difference between the rich and thin, or upper and under lower, strata be as large as possible.

Another problem arises because a fuel injector is disposed in a side intake port to cause a swirling fuel flow. In this situation, there is a high speed inflow of injected fuel, as well as of air, into the combustion chamber, so that the fuel is apt to spread rapidly over the combustion chamber. This results in the difference in airfuel ratios between the rich and thin, or upper and under lower, fuel mixture strata not always being sufficiently large for the fuel mixture to ignite easily, even though the fuel mixture is stratified in the combustion chamber.

To eliminate this problem, an intake system having particularly formed first and second intake ports has been proposed. The first intake port forms a helical intake passage, and the second intake port is provided therein with a intake air control valve which is opened when the engine operates at higher engine loads. A fuel injector is located downstream of the intake air control valve. There has also been proposed an intake system which further has a third intake port, in order to improve charging efficiency, particularly when the engine operates at higher engine loads.

According to such an internal combustion chamber structure as that described above, since the intake air control valve is kept closed when the engine operates between lower and higher engine loads, when an intake valve opens the second intake port in an intake cycle, pressure in the second port, downstream of the intake air control valve, drops rapidly near the pressure in the combustion chamber, so that the difference between the pressures in the second intake port, downstream of the intake air control valve, and in the combustion chamber, is maintained at a small value. Accordingly, the fuel delivered into the second intake port flows into the combustion chamber at relatively low speeds. This prevents the fuel from spreading widely in the combustion chamber and decreases the degree of diffusion of fuel, so as to increase the difference in air-fuel ratios between the rich and thin, or upper and lower, strata of fuel mixture.

If the second intake port is opened in a later stage of an intake cycle, in an attempt to make the difference in air-fuel ratio between the rich and thin, or upper and under lower, strata of fuel mixture larger, because the fuel delivered into the second intake port only flows into the combustion chamber at lower speeds, part of the fuel is left in the second intake port without flowing into the combustion chamber. The residual fuel rushes into the combustion chamber in the next intake cycle at the moment the second intake port is opened.

The fuel remaining in the second intake port from a previous intake cycle and rushing into the combustion chamber in the current intake cycle is concentrated at the center of the combustion chamber and is non-uniformly mixed. This leads to an unfavorable stratification of the fuel mixture. On the other hand, opening the second intake port earlier, in an attempt to allow most of the fuel to flow into the combustion chamber in an intake cycle, causes the fuel to fill the combustion chamber in an early stage of the intake cycle. This also leads to difficulty in favorably stratifying the fuel mixture in the combustion chamber. It has been concluded that a favorable fuel mixture stratification can not in any way be achieved by controlling the intake air control valve so as to open the second intake port at any particular timing.

To obtain a favorable stratification of fuel mixture, it was considered necessary to construct the intake control system so as to always keep the second intake port open and to terminate the injection of fuel at a desired timing. In such an intake control system, however, because the second intake port for delivering fuel mixture was located near the center top of the combustion chamber, a rich stream of fuel mixture from the second intake port not only weakens the swirling of fuel in the combustion chamber, but also is caused to spread outward by the swirling of fuel. This also tends to lead to an unfavorable stratification of the fuel mixture.

In an attempt to improve the stratification of a fuel mixture in a three intake valve engine, one of the three intake ports, and more particularly, a center intake port, is formed so as to open into a combustion chamber near a center top of the combustion chamber, where a spark plug is installed, and is provided with a fuel injector. Such an multi-intake valve internal combustion engine is known from, for instance, Japanese utility model application No. 60-88996, entitled "Fuel Injection Type Internal Combustion Engine with a Plurality of Intake Valves," filed on Jun. 14, 1985, and published as Japanese Unexamined Utility Model Publication No. 61-204922 on Dec. 24, 1986. This multi-valve engine is provided with two side intake ports, one of which is formed as a helical passage and the other of which is provided with a shutter valve.

Such an intake port arrangement prevents fuel mixture, delivered from the center intake port, from spreading outward in the combustion chamber, so as to provide a favorable stratification of the fuel mixture in the combustion chamber. In addition, the intake valve for the intake port is kept open for a later half of the intake cycle, or from midway of an intake cycle to the beginning of a compression cycle following the intake cycle, and the fuel mixture flows into the combustion chamber in a substantially vertical direction at a lower speed. Therefore, the stream of fuel mixture does not weaken fuel swirling in the combustion chamber, and a strong fuel swirl is maintained during the end of the compression cycle. As a result, in this type of multi-valve internal combustion engine, if a thin fuel mixture, such as one having a mean air-fuel ratio of between approximately 30:1 and 25:1, is delivered into the combustion chamber, the combustion of fuel is improved.

In the multi-valve internal combustion engine described above, however, some problems are still encountered in burning of the fuel. More specifically, fuel swirls, due to the helical configuration of the side intake port, are produced along the inner surface of the cylinder bore and are very weak at the center of the cylinder bore. Accordingly, the fuel swirling motion does not contribute to spreading flares produced at the center of the cylinder rapidly, so that the burning of the fuel mixture is not always sufficient. The fuel swirls develop a centrifugal force, so as to force the rich fuel mixture at the center of the cylinder bore outward. This makes it difficult to form a rich stratum of fuel mixture at the center of the combustion chamber.

Another problem arises because of the location of a fuel injector in an upstream part of the intake port. As is well known, the negative pressure of intake air is generally higher at higher engine loads and lower at lower engine loads and, accordingly, fuel delivered by the fuel injector flows in the intake port at a speed which is lower at lower engine loads than it is at the higher engine loads. This leads to fuel being charged into the combustion chamber with low efficiency. Extending the center intake port to the center of the combustion chamber and forming it so as to open substantially vertically into the combustion chamber makes the center intake port have a lengthened and complex passage, which causes a drop in fuel charging efficiency. In addition to this, the amount of fuel droplets adhering to a wall of the intake port increases, so as to generate changes in an air-fuel ratio in the fuel injection cycles and to break the coincidence in timing between fuel injection and air introduction.

SUMMARY OF THE INVENTION

It is, therefore, a primary object of the present invention to provide a multi-valve internal combustion engine in which a fuel mixture is desirably stratified in a combustion chamber.

This object is accomplished by providing a multivalve internal combustion engine having a plurality of intake ports and valves and exhaust ports for one cylinder. The same number of intake ports as there ar intake valves is provided in the cylinder head of the engine. The intake ports open into a combustion chamber of the cylinder. One of the intake ports, desirably a center intake port, if the engine has three intake valves for one cylinder, forms a helical passage opening into a center of the combustion chamber, at the location in which a spark plug is disposed, adjacent an intake valve of the center intake port.

In addition to a fuel injector, which may be disposed in the center intake port adjacent the center intake valve, or in one of the other two intake ports, a secondary fuel injector is desirably disposed adjacent the center intake valve.

BRIEF DESCRIPTION OF THE DRAWINGS

The above and other objects and features of the present invention will be apparent to those skilled in the art from the following detailed description thereof when considered in conjunction with the accompanying drawings, wherein.

DETAILED DESCRIPTION OF THE PREFERRED EMBODIMENT

Figure 1:
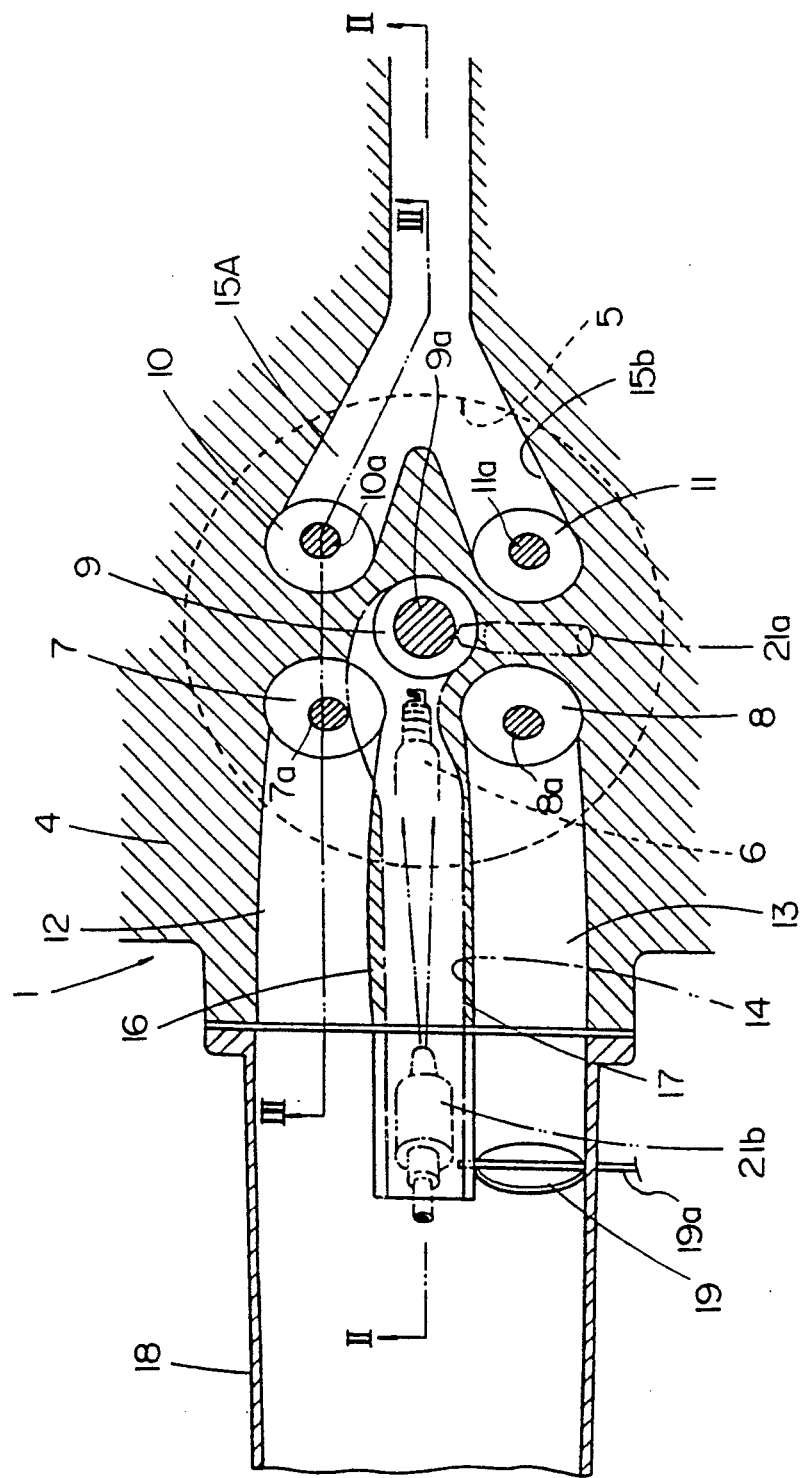
FIG. 1 is a plan view showing part of a multi-valve internal combustion engine in accordance with a preferred embodiment of the present invention.
Figure 2:
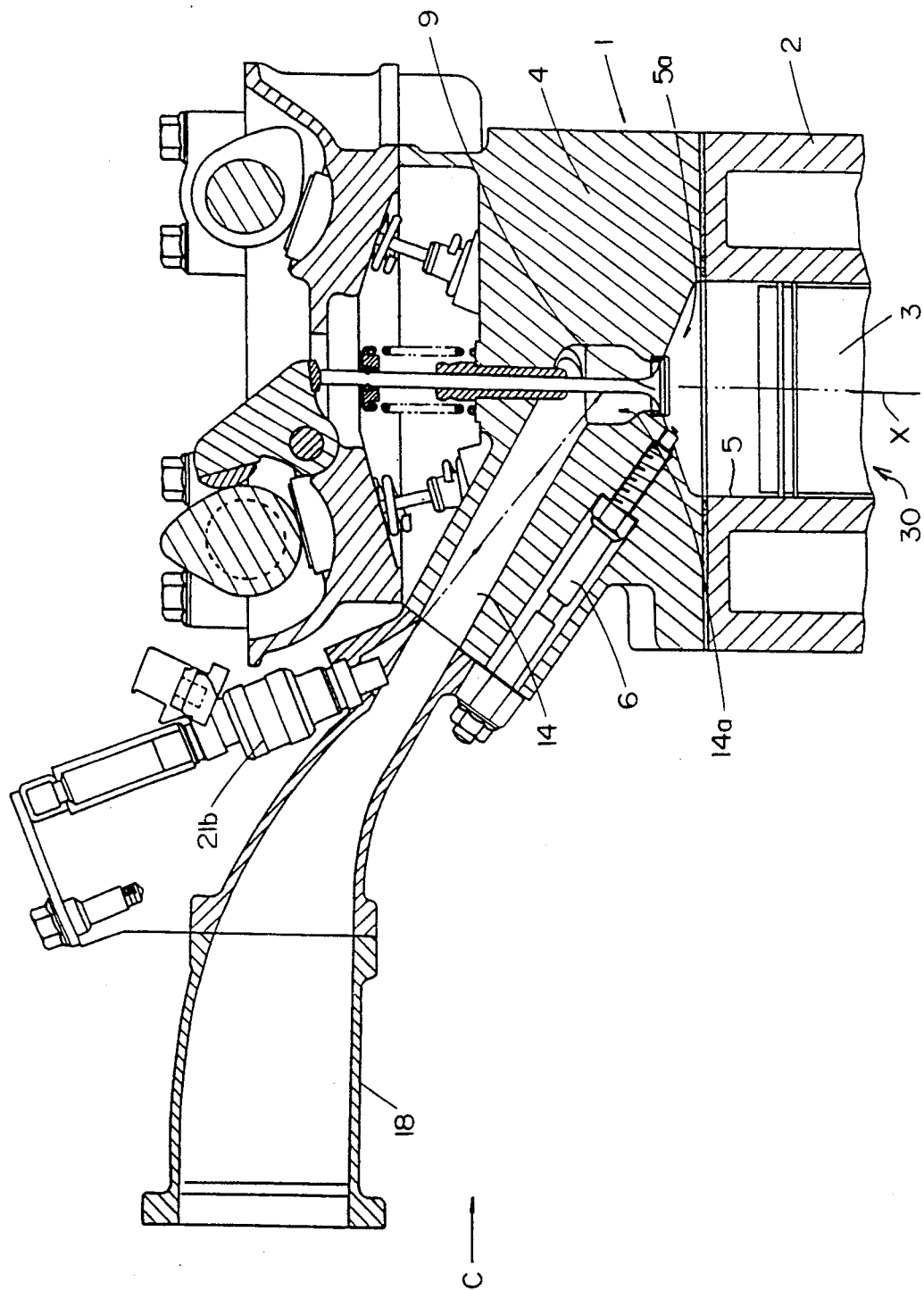
FIG. 2 is a cross-sectional view of FIG. 1 along line II—II.
Figure 3:
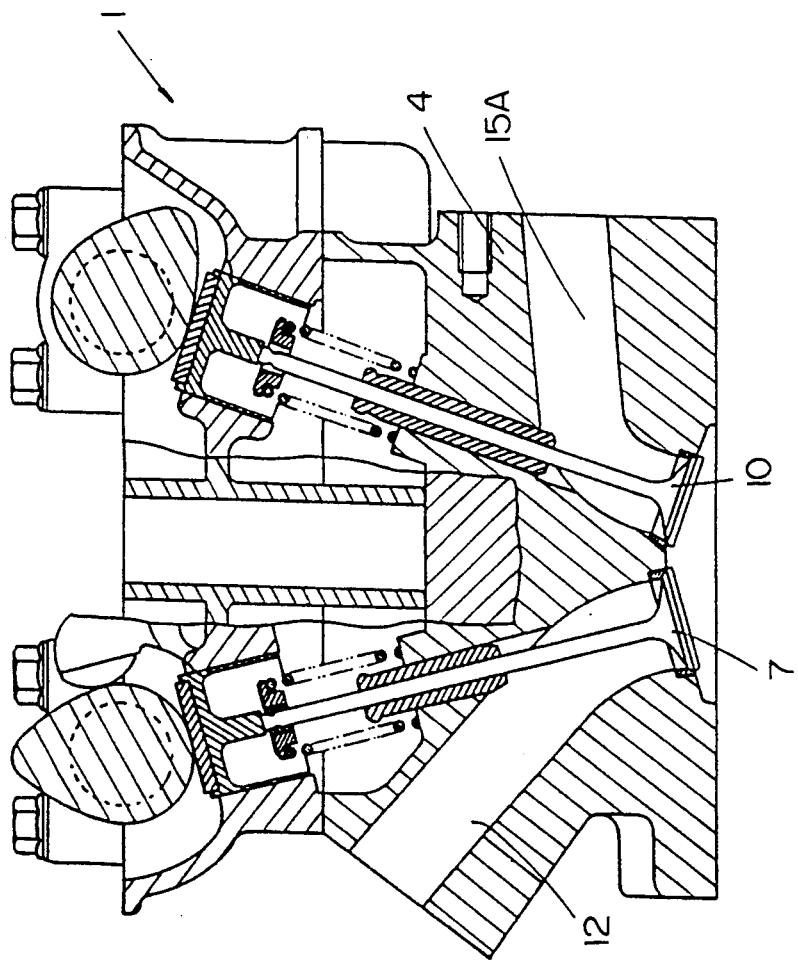
FIG. 3 is a cross-sectional view of FIG. 1 along line III—III.

Referring to the drawings in detail, and in particular, to FIGS. 1 to 4, a multi-valve internal combustion engine 1 in accordance with a preferred embodiment of the present invention is shown, and comprises an engine block 2 and a cylinder head 4. The engine block 2 is provided with a plurality of cylinders 30, formed with cylinder bores 5 (one of which is shown). Each cylinder bore 5 receives a piston 3 therein for reciprocating sliding movement. The cylinder head 4 is mounted on the engine block 2. Combustion chamber 5a is formed in each cylinder 12 by the top of the piston 3, a lower wall of the cylinder head 4 and the cylinder bore 5. Each cylinder 30 in the cylinder head 4 is formed with three, namely, first, second and third, intake ports 12, 13 and 14, having openings which extend toward one side of the engine 1. Each cylinder 30 of the cylinder head 4 is further formed with two, namely, first and second, exhaust ports 15A and 15B, having openings which extend to another side of the engine 1. The intake ports 12, 13 and 14 and the exhaust ports 15A and 15B are opened and shut at a predetermined timing by first to third intake valves 7, 8 and 9, having respective valve stems 7a, 8a and 8b, and exhaust valves 10 and 11, having respective valve stems 10a and 11a. The first and second intake valves 7 and 8 have the same external diameter, which is larger than an external diameter of the third intake valve 9. These first, second and third intake valves 7, 8 and 9 and first and second exhaust valves 10 and 11 are so arranged that third intake valve 9 opens to the center of the combustion chamber 5a of the cylinder 30, and is located in alignment with a vertical center line X of the cylinder bore 5, and the first and second intake and exhaust valves 7, 8, 10 and 11 are located on a circle which is coaxial with the third intake valve 9. The cylinder head 4 is provided with a spark plug 6 and a secondary fuel injector 21a, which are adjacent the third intake valve 9 and face perpendicularly to each other, and a main fuel injector 21b, which will be described in detail later.

Intake ports 12, 13 and 14, although being separated from one another by a pair of partition walls 16 and 17, are joined together by an integrated intake port 18. The third, or center, intake port 14 is formed to extend and spiral to the center of the combustion chamber 5a so as to produce air swirls at a desired flow rate in the combustion chamber when the engine operates at lower engine loads. The first and second, or side, intake ports 12 and 13 extend substantially in a straight line and are parallel to each other. Similarly, the exhaust ports 15A and 15B are joined together by an integrated exhaust port 15C.

One of the side intake ports, for instance the second intake port 13, is provided with an intake air control valve 19 therein, and is opened and shut thereby. The intake air control valve 19 has a rotary shaft 19a turned by an pneumatic actuator (not shown) according to negative pressure of intake air introduced into the engine 1. In particular, the intake air control valve 19 is closed when the engine 1 operates at lower engine loads.

Figure 4:
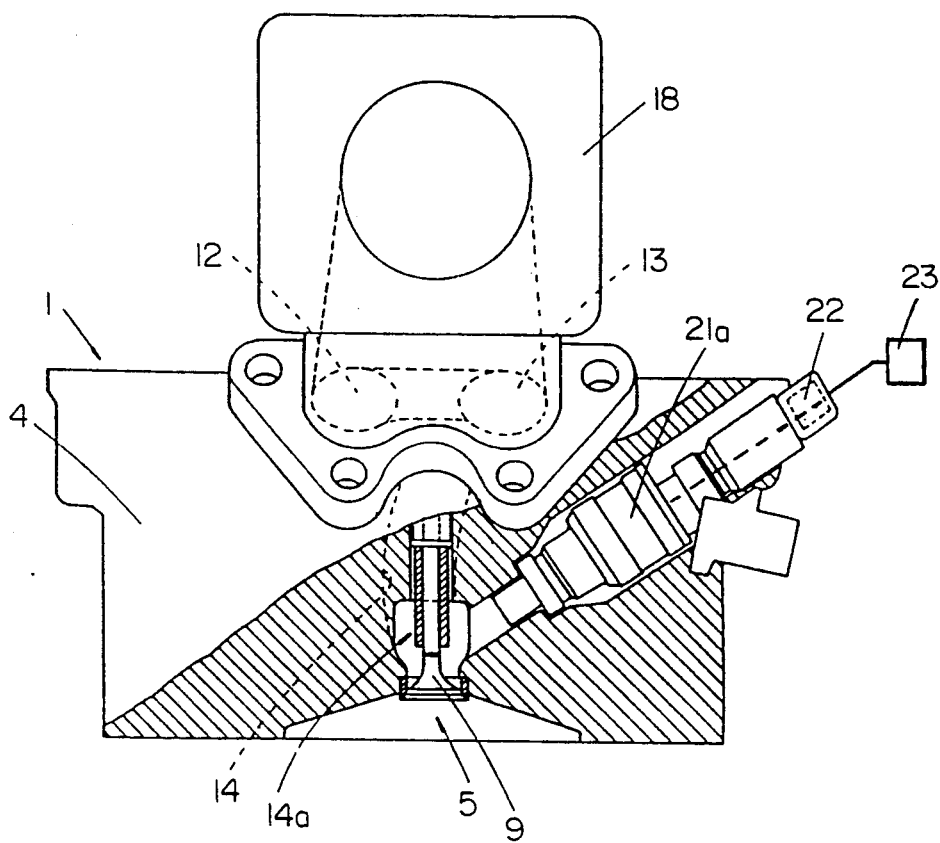
FIG. 4 is a side view, partly in cross-section, of FIG. 2 as seen in the direction of arrow C.

The third, center, intake port 14, which, as noted above, is generally formed as helical passage, is provided at its end, opening into the combustion chamber 5a, with a substantially cylindrical bottom chamber 14a formed coaxially with the intake valve 9 and extending vertically upwardly from the combustion chamber 5a. The main fuel injector 21b, disposed in the center intake port 14 close to the side of the cylinder head 4, is directed toward the bottom chamber 14a and is pulsed or energized mainly to deliver fuel into the combustion chamber 5a. The secondary fuel injector 21a is provided with a fuel pipe 22, partly located within the cylinder head 4 as is shown in FIG. 4. The secondary fuel injector 21a is pulsed or energized to deliver fuel into the combustion chamber 5a when the engine operates at lower engine loads in order to eliminate a drop in fuel charging efficiency which possibly will be caused by having the center spiral intake port 14 extend to the center of the combustion chamber and by the presence of the bottom chamber 14a, which increases chances that droplets of fuel will adhere to the inner wall of the intake port 14. In addition, due to the provision of the secondary fuel injector 21a, when the engine 1 operates at lower engine loads, the secondary fuel injector 21a sprays fuel into fuel swirls produced by the center intake port 14, which generally contain less fuel.

Figure 5:
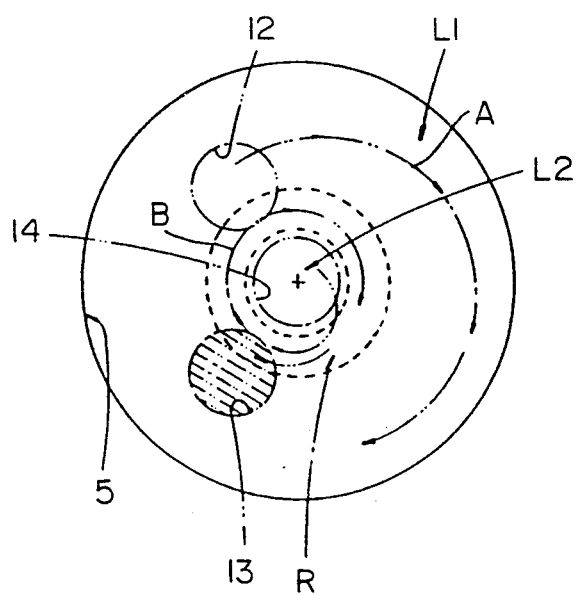
FIG. 5 is an explanatory illustration showing a stratification of fuel mixture in a combustion chamber in a radial direction.

In operation of the multi-valve internal combustion engine according to the present invention described above, when the engine 1 runs at lower engine loads, thereby closing the intake air control valve 19, intake air is introduced into the engine through the first and third intake ports 12 and 14. In particular, the intake air introduced through the side intake port 12 is forced to flow along the inner wall of the cylinder bore 5, as is indicated by an arrow A in FIG. 5, so as to produce an annular (doughnut-shaped) lean stratum to fuel mixture L1 along the inner wall of the cylinder bore 5. On the other hand, the first, or center, helical intake port 14 provides the intake air introduced therethrough with fuel swirls in a center zone of the combustion chamber 5a, as is indicated by an arrow B in FIG. 5. The fuel swirls are mixed with fuel delivered by the secondary fuel injector 21a near the bottom chamber 14a of the helical intake port 14, so as to produce an enriched fuel mixture stratum R in a center zone of chamber 5a, excepting a center area L2, where the spark plug 6 is placed. Eventually, the fuel mixture introduced through the intake ports 12 and 14 is well stratified in a radial direction of the combustion chamber 5a into an outer lean stratum and an inner rich stratum. As a result, the fuel mixture is desirably burned at the center of the combustion chamber 5a, and flares spread rapidly radially from the center of the combustion chamber 5a, so as to produce a greatly reduced amount of hydrocarbons (HC).

Providing the secondary fuel injector 21a operated by control circuit 23 for lower engine loads makes it possible to deliver fuel precisely and timely in response to the introduction of intake air, so as to produce a desirably stratified fuel mixture.

Because the secondary fuel injector 21a and its fuel pipe 22 are placed within the cylinder head 4, the fuel delivered by the secondary fuel injector 21a is heated prior to injection into and combustion by the engine 1, so as to be easily vaporized and sprayed into the combustion chamber 5a. This helps the engine to start at lower temperatures.

It is to be understood that the intake air control valve 19 in the second intake port 13 may, if desired, be removed, and that the main fuel injector 21b may be disposed in the first side intake port 12 rather than in the third center intake port 14.

It is also to be understood that although the present invention has been described in detail with respect to a preferred embodiment thereof, nevertheless, various other embodiments and variants may occur to those skilled in the art which are within the spirit and scope of the invention, and such other embodiments and variants are intended to be covered by the following claims.

What is claimed is:

1. A multi-valve internal combustion engine comprising:
    a plurality of intake valves for one cylinder;
    an engine body having a cylinder block formed with a cylinder bore, a cylinder head mounted on said cylinder block, and a piston, slidably received in said cylinder bore and, together with said cylinder block, cylinder bore and cylinder head, forming a combustion chamber; and
    intake ports, in the same number as there are intake valves, formed in said cylinder head and opening into said combustion chamber, one of said intake valves disposed in each of said intake ports, one of said intake ports forming a helical passage opening into a center of said combustion chamber.

2. A multi-valve internal combustion engine as recited in claim 1, and further comprising a spark plug located adjacent an intake valve disposed in said one of said intake ports.

3. A multi-valve internal combustion engine as recited in claim 2, and further comprising a fuel injector disposed in said one of said intake ports.

4. A multi-valve internal combustion engine as recited in claim 1, wherein said one of said intake ports is a center intake port and two side intake ports are disposed on opposite sides of a centerline of said center intake port.

5. A multi-valve internal combustion engine as recited in claim 4, and further comprising a spark plug located adjacent the intake valve disposed in said center intake port.

6. A multi-valve internal combustion engine as recited in claim 5, and further comprising a fuel injector disposed in said center intake port adjacent the intake valve disposed in said center intake port.

7. A multi-valve internal combustion engine as recited in claim 6, and further comprising a secondary fuel injector disposed adjacent the intake valve disposed in said center intake port.

8. A multi-valve internal combustion engine as recited in claim 7, wherein said secondary fuel injector is energized by control means when said engine operates at lower engine loads.

9. A multi-valve internal combustion engine as recited in claim 5, and further comprising an intake air control valve disposed in one of said two side intake ports, said intake air control valve being closed to shut said one of said two side intake ports when said engine operates at lower engine loads.

* * * * *